US012746628B2

(12) United States Patent
Tanaka et al.

(10) Patent No.: US 12,746,628 B2
(45) Date of Patent: Sep. 29, 2026

(54) TOOL TRANSPORT DEVICE

(71) Applicant: DMG MORI CO., LTD., Nara (JP)

(72) Inventors: Koji Tanaka, Nara (JP); Hiroshi Yasuda, Nara (JP); Hiromitsu Nakaoka, Nara (JP)

(73) Assignee: DMG MORI CO., LTD., Nara (JP)

( * ) Notice: Subject to any disclaimer, the term of this patent is extended or adjusted under 35 U.S.C. 154(b) by 390 days.

(21) Appl. No.: 18/557,490

(22) PCT Filed: Apr. 27, 2021

(86) PCT No.: PCT/JP2021/016715
§ 371 (c)(1),
(2) Date: Oct. 26, 2023

(87) PCT Pub. No.: WO2022/230036
PCT Pub. Date: Nov. 3, 2022

(65) Prior Publication Data
US 2024/0217042 A1 Jul. 4, 2024

(51) Int. Cl.
*B23Q 3/155* (2006.01)
*B25J 5/02* (2006.01)

(52) U.S. Cl.
CPC ....... *B23Q 3/1554* (2013.01); *B23Q 3/15526* (2013.01); *B23Q 3/15536* (2016.11); (Continued)

(58) Field of Classification Search
CPC .............. B23Q 3/1554; B23Q 3/15526; B23Q 3/15536; B23Q 3/15539; B23Q 2003/155404; B25J 5/02
See application file for complete search history.

(56) References Cited

U.S. PATENT DOCUMENTS

| | | | | |
|---|---|---|---|---|
| 8,282,333 B2 * | 10/2012 | Oda | B23Q 7/005 414/751.1 |
| 9,375,907 B2 * | 6/2016 | Boge | B25J 9/0084 |
| 2023/0294228 A1 * | 9/2023 | Yasuda | B23Q 3/15773 483/1 |

FOREIGN PATENT DOCUMENTS

| | | |
|---|---|---|
| JP | 2007069338 A | 3/2007 |
| JP | 2009131937 A | 6/2009 |

(Continued)

OTHER PUBLICATIONS

International Search report related to Application No. PCT/JP2021/016715; reported on Jul. 20, 2021.

*Primary Examiner* — Ryan J. Walters

(57) ABSTRACT

A tool transport device includes a moving device, a tool attachment/detachment robot (30), a tool holding device (20), and a controller and transports a tool body (TB) between a tool magazine of a machine tool and a tool storage device. The tool attachment/detachment robot (30) and the tool holding device (20) are arranged on a moving platform (15) of the moving device, and the moving device moves the moving platform (15) to a working position for the tool magazine and a working position for the tool storage device. The tool attachment/detachment robot (30) transports the tool body (TB) by gripping an outer surface of the tool body (TB). The tool holding device (20) has a tool holding member (21, 23) having a cutout-shaped holding portion (22, 24) formed on a side face thereof. The tool body (TB) is to be held by two parallel engagement surfaces formed in a direction perpendicular to an axis of the tool body (TB) engaging with the holding portion (22, 24). The holding portion (22, 24) is formed on the tool holding member (21, 23) to be inclined backward in a direction away from the tool attachment/detachment robot (30).

7 Claims, 8 Drawing Sheets

(52) U.S. Cl.
CPC ............ *B23Q 3/15539* (2016.11); *B25J 5/02* (2013.01); *B23Q 2003/155404* (2016.11)

(56) References Cited

FOREIGN PATENT DOCUMENTS

| | | | | | |
|---|---|---|---|---|---|
| JP | 2015182214 | A | | 10/2015 | |
| JP | 2019072827 | A | | 5/2019 | |
| JP | 6793278 | B1 | * | 12/2020 | ......... B23Q 3/15724 |

* cited by examiner

TOOL TRANSPORT DEVICE

TECHNICAL FIELD

The present invention relates to a tool transport device that transports a tool between a machine tool including a tool magazine holding a plurality of tools and a tool storage device storing a plurality of tools.

BACKGROUND ART

Japanese Unexamined Patent Application Publication No. 2009-131937 discloses a known conventional machine tool that includes a tool changer with a tool magazine as mentioned above. This tool changer is disposed in the vicinity of the machine tool. This tool changer is configured to grip a tool stored in the tool magazine with a tool gripping member and attach the tool to a spindle of the machine tool and to grip a tool attached to the spindle with the tool gripping member and detach the tool from the spindle and then store the tool into the tool magazine.

In the field of machine tools as described above, unmanned continuous operation for a long period of time has been planned in recent years. Further, various kinds of machining are performed in one machine tool nowadays. On these backgrounds, the number of tools to be stored and prepared in the tool magazine is now extremely large. On the other hand, the tool capacity of the tool magazine is naturally limited because of an issue in the installation space for the tool magazine.

Therefore, a machining system has been proposed in which a large-capacity tool storage device able to store a large number of tools is provided, a plurality of machine tools are arranged around the tool storage device, and a tool transport device is provided to transport a tool between a tool magazine of each machine tool and the tool storage device. In this machining system, it is possible to supply a tool necessary for each machine tool, from among the tools stored in the large-capacity tool storage device, to the tool magazine of the machine tool as necessary and as appropriate, which achieves both the unmanned continuous operation for a long period of time and the performance of various kinds of machining in one machine tool.

As for the tool transport device, for example, a tool transport device has been proposed which includes a moving device, a tool attachment/detachment robot, a tool holding member, and a controller. The moving device has a moving platform and moves the moving platform to a working position set for each tool magazine and a working position set for the tool storage device. The tool attachment/detachment robot and the tool holding member are arranged on the moving platform. The controller controls operations of the moving device and tool attachment/detachment robot.

In this tool transport device, under control by the controller, the moving platform of the moving device moves between the working position set for each tool magazine and the working position set for the tool storage device, and the tool attachment/detachment robot arranged on the moving platform performs extraction of a tool and storage of a tool from and into a target tool magazine and performs extraction of a tool and storage of a tool from and into the tool storage device. The tool holding member has a cutout-shaped holding portion formed on a side face thereof. A tool extracted by the tool attachment/detachment robot is held into the holding portion through an opening of the cutout of the holding portion by the tool attachment/detachment robot and transported in the state of being held in the holding portion.

CITATION LIST

Patent Literature

Patent Literature 1: Japanese Unexamined Patent Application Publication No. 2009-131937

SUMMARY OF INVENTION

Technical Problem

The holding portion of the above-described conventional tool holding member is configured to hold a tool in a posture with its axis disposed vertically. Therefore, if vertical vibration generated by movement of the moving platform propagates to the holding portion, the tool held in the holding portion easily vibrates vertically in synchronization with the propagating vertical vibration. This vibration of the tool weakens the restraining force caused by friction between the tool and the holding portion, which results in a problem that the tool easily moves horizontally and falls from the holding portion. On the other hand, in order to prevent the tool from falling, it is conceivable to provide the holding portion with means for clamping the tool. However, providing such clamping means causes another problem that the cost for manufacturing the tool holding member is increased.

Further, where the tool holding member is provided with a plurality of holding portions, a configuration has been conventionally employed in which the holding portions are disposed in a horizontal plane. However, such a configuration requires a large planar space for installation of the tool holding member on the moving platform, which results in a problem that other devices needed for preferred configurations, such as an air blow device for cleaning the tool, cannot be installed on the moving platform.

The present invention has been achieved in view of the above-described circumstances and an object of the invention is to provide a tool transport device which enables a tool to be stably held by a tool holding member and enables even the tool holding member having a plurality of holding portions to be installed in a space narrower than conventionally needed.

Solution to Problem

To solve the above-described problem, the present invention provides a tool transport device that transports a tool body between a machine tool including a tool magazine holding a plurality of tool bodies and a tool storage device storing a plurality of tool bodies, the tool body including a tool and a tubular member having the tool inserted therein, the tool transport device including:

- a moving device that has a moving platform and moves the moving platform to a working position set for the tool magazine and a working position set for the tool storage device;
- a tool attachment/detachment robot and a tool holding member that are arranged on the moving platform; and
- a controller that controls operations of the moving device and tool attachment/detachment robot, wherein:
- the tool attachment/detachment robot is configured to transport the tool body by gripping an outer peripheral portion of the tubular member;

the tool holding member is disposed in an operating area of the tool attachment/detachment robot and has a cutout-shaped holding portion formed on a side face thereof, the holding portion having an opening and having at least two parallel inner surfaces located in a vertical direction and facing each other;

the holding portion is configured such that the two inner surfaces thereof are able to engage with two parallel engagement surfaces formed in a direction perpendicular to an axis of the tubular member on an outer peripheral portion of the tubular member; and the holding portion is formed on the tool holding member such that a plane parallel to an arranged direction of the two inner surfaces and orthogonal to the two inner surfaces is inclined backward in a direction away from the tool attachment/detachment robot.

This tool transport device transports a tool body between, for example, at least one machine tool including a tool magazine holding a plurality of tool bodies and a tool storage device storing a plurality of tool bodies. The tool body includes a tool and a tubular member having the tool inserted therein. More specifically, under control by the controller, the moving platform of the moving device moves between the working position set for each tool magazine and the working position set for the tool storage device, and the tool attachment/detachment robot arranged on the moving platform performs extraction of a tool body and storage of a tool body from and into a target tool magazine and performs extraction of a tool body and storage of a tool body from and into the tool storage device. A tool body extracted by the tool attachment/detachment robot is attached to the holding portion of the tool holding member and transported in the state of being held in the holding portion.

In this process, the tool body is held in the holding portion by the two parallel engagement surfaces thereof, which are formed in a direction perpendicular to the axis of the tubular member on an outer peripheral portion of the tubular member, engaging with the two inner surfaces of the holding portion. The holding portion is provided such that the plane parallel to the arranged direction of the two inner surfaces and orthogonal to the two inner surfaces is inclined backward in a direction away from the tool attachment/detachment robot. Therefore, not only the own weight of the tool body but also a moment corresponding to the weight of the tool body act on the engagement between the tool body and the holding portion. Consequently, even if vertical vibration generated by movement of the moving platform propagates to the holding portion, the tool held in the holding portion hardly vibrates vertically in synchronization with the propagating vertical vibration. Therefore, even if the tool body vibrates, the restraining force caused by friction between the tool body and the holding portion is maintained, whereby the tool body is maintained in the state of being held in the holding portion.

Thus, this tool transport device enables a tool body to be transported in a state of being stably held in the holding portion of the tool holding member even if vertical vibration propagates to the holding portion in the transport. Therefore, it is not necessary to take a special measure, such as providing the holding portion with means for tool clamping, in order to prevent the tool body from falling from the holding portion, which enables the tool holding member to be manufactured at low cost.

The tool transport device may have a configuration in which the holding portion is provided such that the two inner surfaces are inclined with the opening facing upward with respect to a horizontal line in the plane parallel to the arranged direction of the two inner surfaces and orthogonal to the two inner surfaces. In this configuration, the tool holding member has the holding portion provided in the inclined state with the opening facing upward. Therefore, when the tubular member of the tool body is held in the holding portion by insertion through the opening of the holding portion such that the engagement surfaces of the tool body engage with the two inner surfaces of the holding portion, the tool body receives a biasing force toward the side opposite to the opening of the holding portion (i.e., toward the bottom side) due to its own weight. Thereby, the tool body is more effectively prevented from falling from the holding portion due to propagation of vertical vibration generated by movement of the moving platform.

Further, the tool transport device may have a configuration in which a plurality of holding portions are disposed at predetermined intervals in the vertical direction. In the tool transport device having this configuration, the plurality of holding portions are disposed at predetermined intervals in the vertical direction so that a plurality of tool bodies are held in a manner such that the tool bodies are stacked on top of another. Therefore, the tool holding member can be installed in a small planar space on the moving platform. Further, such a narrowed installation space allows other devices needed for preferred configurations, such as an air blow device for cleaning the tool, to be installed on the moving platform, which enables multi-functionalization of the tool transport device.

Further, the tool transport device may have a configuration in which the tool holding member is erected on the moving platform with the tool holding member inclined backward in a direction away from the tool attachment/detachment robot.

If the tool holding member is disposed vertically, the holding portion located at a higher position requires a larger tilt of an arm of the tool attachment/detachment robot away from the tool holding member (i.e., in a direction away from the tool holding member) when the tool attachment/detachment robot attaches a tool body to the holding portion. This results in the tool attachment/detachment robot operating in a constrained manner and, in some cases, the tool attachment/detachment robot becoming inoperable due to its singularities.

Inclining the tool holding member backward in a direction away from the tool attachment/detachment robot prevents the arm of the tool attachment/detachment robot from being extremely tilted away from the tool holding member (i.e., in a direction away from the tool holding member) when the tool attachment/detachment robot attaches a tool body to the holding portion located at a high position, which allows the tool attachment/detachment robot to operate smoothly.

Advantageous Effects of Invention

The tool transport device according to the present invention enables a tool body to be transported in a state of being stably held in the holding portion of the tool holding member even if vertical vibration propagates to the holding portion in the transport. Therefore, it is not necessary to take a special measure, such as providing the holding portion with means for tool clamping, in order to prevent the tool body from falling from the holding portion, which enables the tool holding member to be manufactured at low cost.

DESCRIPTION OF EMBODIMENTS

Hereinafter, a specific embodiment of the present invention will be described with reference to the drawings.

Figure 1:
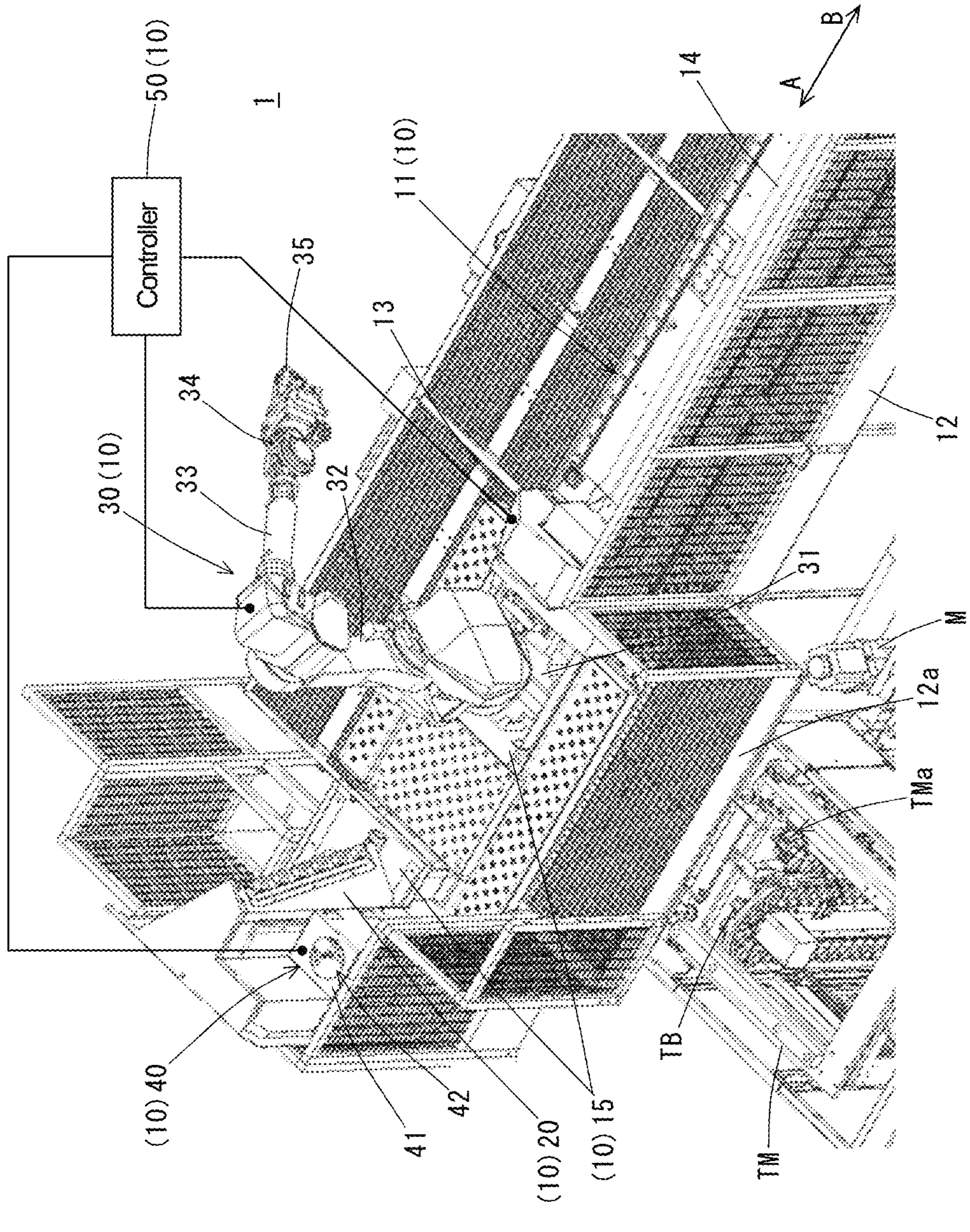
FIG. 1 is a perspective view of a machining system according to an embodiment of the present invention, mainly showing a tool transport device of the machining system.
Figure 2:
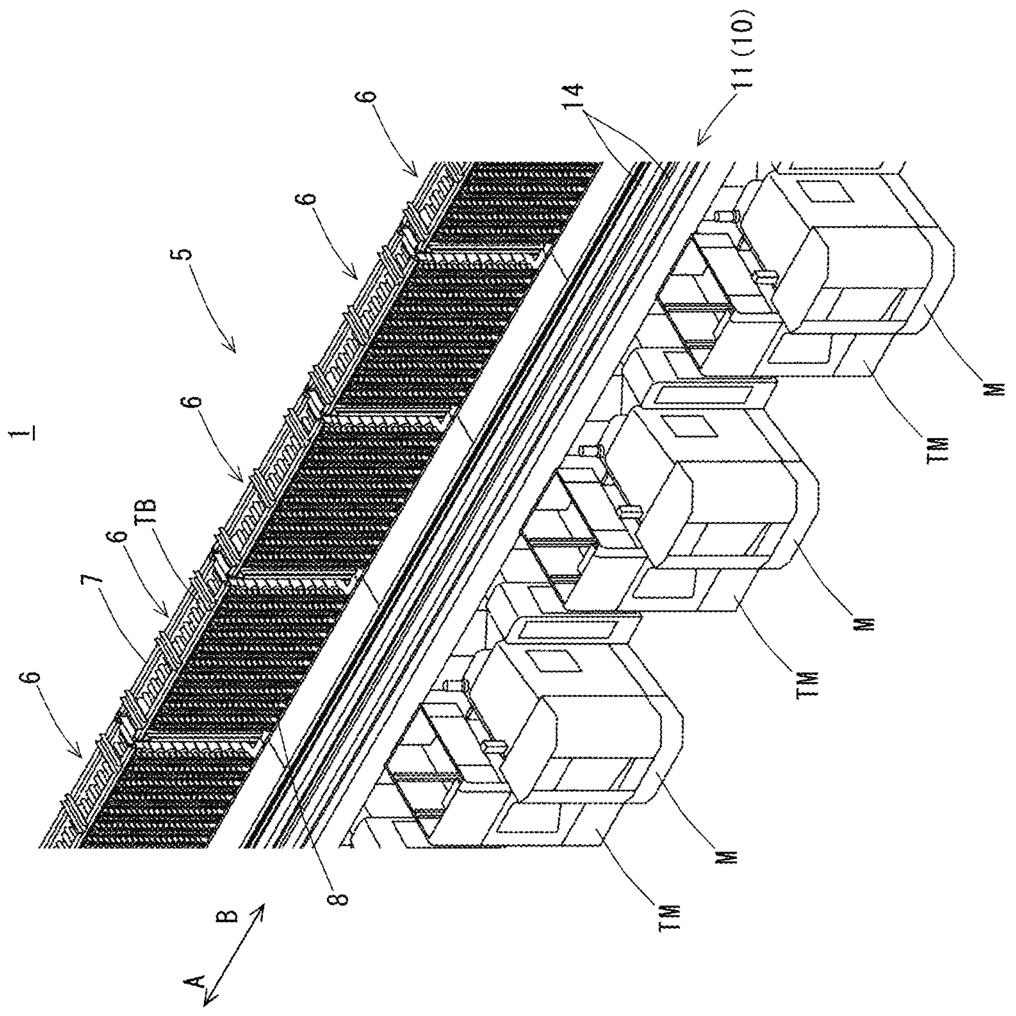
FIG. 2 is a perspective view of the machining system according to the embodiment, mainly showing a tool storage device of the machining system.

As illustrated in FIGS. 1 and 2, a machining system 1 according to this embodiment includes a plurality of machine tools M, a tool storage device 5, and a tool transport device 10. The machine tools M are arranged in a row along an A-B direction. The tool storage device 5 has a plurality of tool storage racks 6 arranged in a row along the A-B direction so as to face the row of machine tools M. The tool transport device 10 is disposed between the row of machine tools M and the row of tool storage racks 6 to transport a tool body TB between the machine tools M and the tool storage racks 6. The machining system 1 illustrated in FIG. 1 extends in the direction of arrow B. The row of machine tools M and row of tool storage racks 6 illustrated in FIG. 2 are arranged on the extension of the machining system 1. As a matter of course, the machining system 1 has an end of the arrangement in the direction of arrow B.

Figure 6:
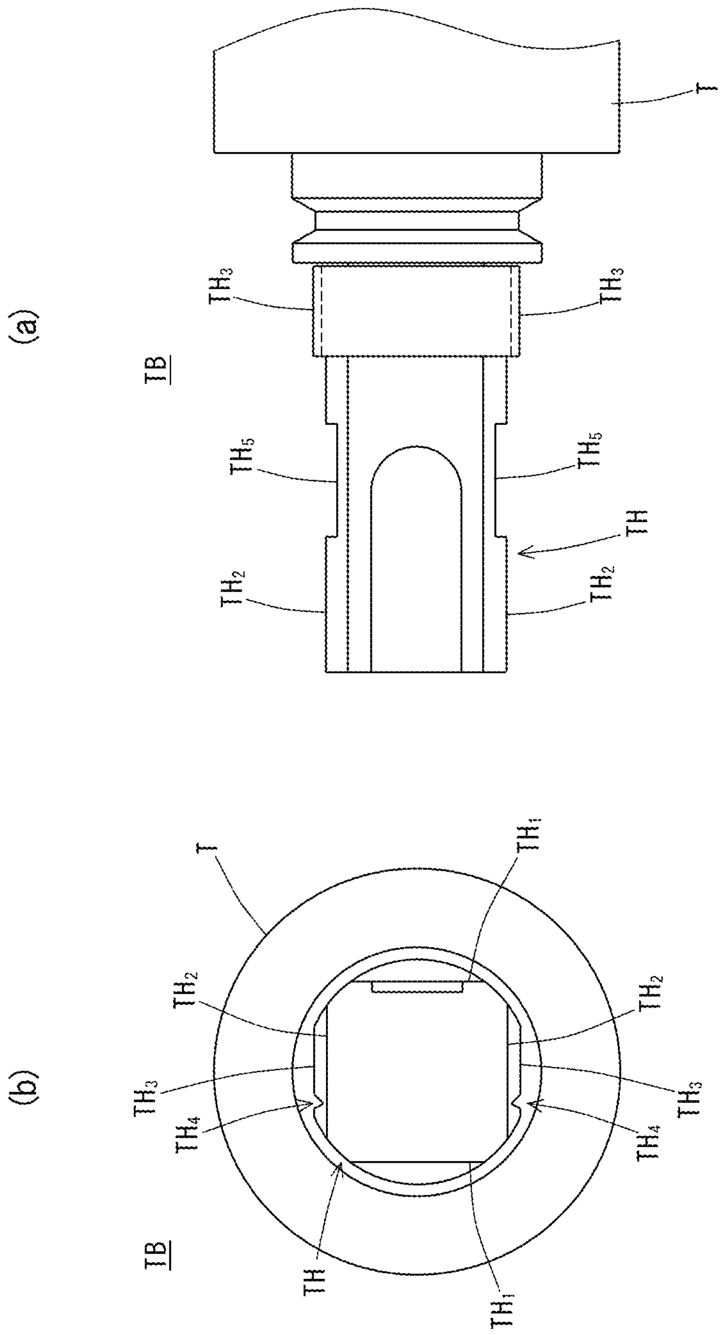
FIG. 6 shows (a) a front view and (b) a left side view of a tool body in the embodiment.

As illustrated in FIG. 6, the tool body TB consists of a tool T and a tool holder TH holding the tool T. The tool holder TH is composed of a tubular member. The tool holder TH has a housing hole (not illustrated) that is open to one end surface, namely, an end surface located on the right side in FIG. 6, of the tool holder TH. The tool holder TH also has a ball lock mechanism (not illustrated) provided in the housing hole (not illustrated). The tool T is clamped by the ball lock mechanism (not illustrated) with a shaft portion of the tool T inserted in the housing hole (not illustrated), whereby the tool T is held by the tool holder TH. Attachment and detachment of the tool T to and from the tool holder TH can be carried out by a human power.

The tool holder TH has two widths across flats $TH_1$, $TH_2$ on the outer periphery thereof at the side opposite to the opening in the axial direction of the tool holder TH. The widths across flats $TH_1$, $TH_2$ are each formed with the axis of the tool holder TH located between the flats and are formed in directions such that normal lines thereof are orthogonal to each other. The tool holder TH also has a width across flats $TH_3$ on the outer periphery thereof at the opening side in the axial direction of the tool holder TH. The width across flats $TH_3$ is also formed with the axis of the tool holder TH located between the flats and has a greater width than the widths across flats $TH_1$, $TH_2$.

The width across flats $TH_3$ is formed such that a normal line thereof is parallel to the normal line of the width across flats $TH_2$ and the flats thereof respectively have V-shaped grooves $TH_4$, $TH_4$ formed therein that extend along the axial direction of the tool holder TH. Further, the flats of the width across flats $TH_2$ respectively have engagement grooves $TH_5$, $TH_5$ formed therein that extend along a direction perpendicular to the axis of the tool holder TH.

Each machine tool M includes a tool magazine TM storing a plurality of tool bodies TB and is configured to perform predetermined machining using the tool bodies TB stored in the tool magazine TM. Each machine tool M includes a numerical controller (not illustrated). The numerical controller (not illustrated) numerically controls motion mechanism units and controls operation of the tool magazine TM. Each holding unit of the tool magazine TM has a pair of clamp claws that are each composed of a spring body. By the clamp claws fitting into the V-shaped grooves $TH_4$, $TH_4$ of the tool body TB, the tool body TB is clamped by the clamp claws and held in the holding unit.

Each tool storage rack 6 consists of a plurality of holding frames 8 and a casing-like support frame 7. The holding frames 8 are erected at predetermined intervals along the A-B direction. The support frame 7 supports the holding frames 8. Each holding frame 8 has cutouts (holding portions) on either side face thereof. The cutouts are arranged at predetermined pitches and are formed to be open outward. Each cutout has a pair of clamp claws that are each composed of a spring body. By the clamp claws fitting into the V-shaped grooves $TH_4$, $TH_4$ of the tool body TB, the tool body TB is clamped by the clamp claws and held in the cutout.

The tool transport device 10 includes a moving device 11, a moving platform 15, a tool holding device 20, a tool attachment/detachment robot 30, an air blow device 40, and a controller 50. The moving device 11 is disposed along the A-B direction. The moving platform 15 is moved by the moving device 11. The tool holding device 20, the tool attachment/detachment robot 30, and the air blow device 40 are arranged on the moving platform 15. The controller 50 controls operations of the moving device 11, tool attachment/detachment robot 30, and air blow device 40.

The moving device 11 consists of a pair of guide rails 14, a support base 12, and a drive device 13. The guide rails 14 are arranged parallel to each other along the A-B direction to guide movement of the moving platform 15. The support base 12 supports the guide rails 14. The drive device 13 moves the moving platform 15.

For example, the drive device 13 consists of a rack (not illustrated) arranged along the A-B direction on the support base 12, a pinion gear (not illustrated) arranged on the moving platform 15, and a motor (not illustrated) driving the pinion gear (not illustrated). The pinion gear (not illustrated) meshes with the rack (not illustrated). The pinion gear (not illustrated) is rotated by the motor (not illustrated), so that the moving platform 15 is guided by the guide rails 14 and moved along the A-B direction through the meshing between the pinion gear (not illustrated) and the rack (not illustrated).

The position of the moving platform 15 in the A-B direction is detected, for example, by a position detector (not illustrated) that consists of a scale (not illustrated) arranged along the A-B direction on the support base 12 and a reader (not illustrated) arranged on the moving platform 15 to read a position on the scale (not illustrated). Under control by the controller 50, the moving platform 15 is driven by the drive device 13 based on position information detected by the position detector (not illustrated) to move to a working position set for each machine tool M and a working position set for each tool storage rack 6. In this example, the position shown in FIG. 1 (the end position in the direction of arrow A) is the home position of the moving platform 15. This position also serves as a working position for the tool magazine TM of the machine tool M disposed at the end in the direction of arrow A. The support base 12 has a landing 12*a* for maintenance formed thereon at this position. The landing 12*a* is formed on a portion corresponding to the tool magazine TM. If necessary, the landing 12*a* may be formed on a portion corresponding to each tool magazine TM.

The tool attachment/detachment robot 30 is composed of a six-axis articulated robot that includes a base 31 fixed on the moving platform 15, a first arm 32 arranged on the base 31, a second arm 33 connected to the first arm 32, a third arm 34 connected to the second arm 33, and a hand 35 as an end effector arranged at the distal end of the third arm 34. Under operation control by the controller 50, the hand 35 is moved to positions within a three-dimensional space and brought into poses. The hand 35 is composed of the so-called gripper and is able to grip the width across flats $TH_2$ of the tool holder TH of the tool body TB.

Figure 3:
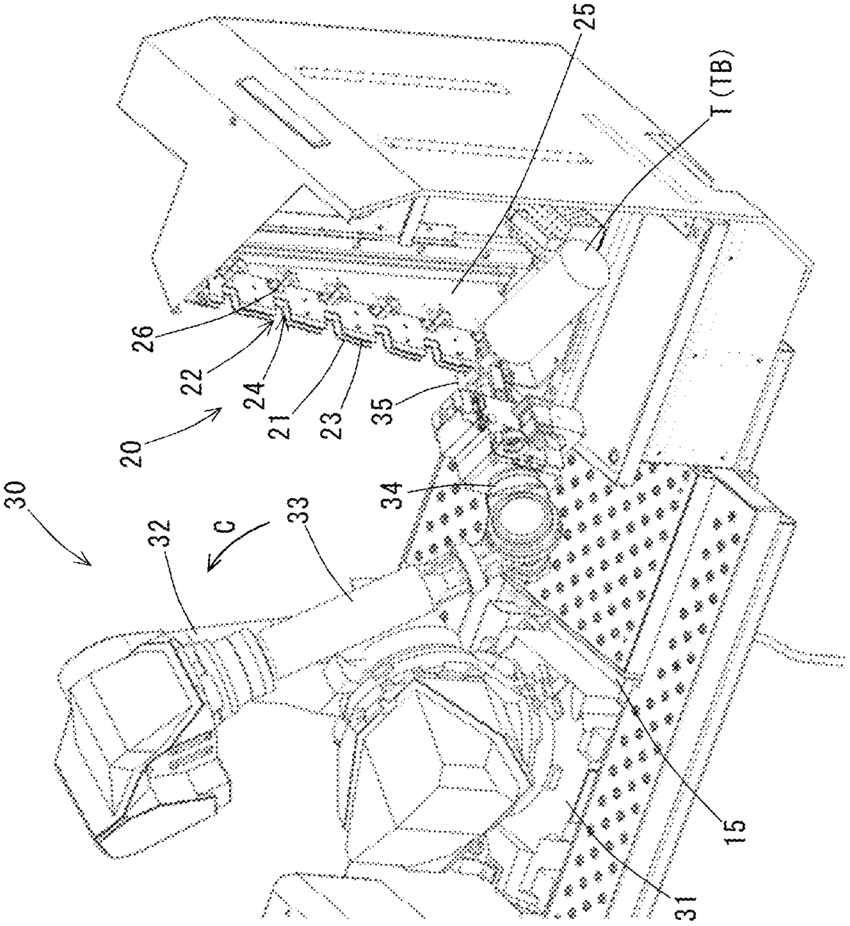
FIG. 3 is an illustrative diagram for explaining operation of a tool attachment/detachment robot in the embodiment.
Figure 4:
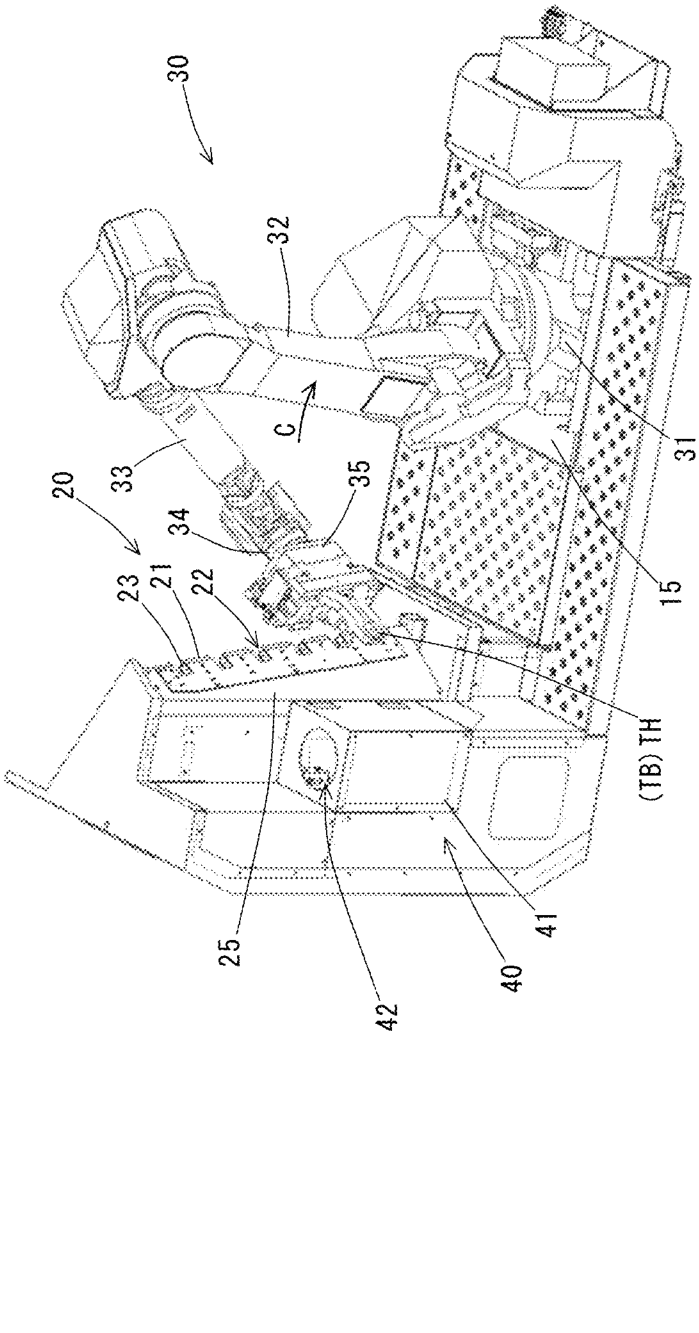
FIG. 4 is an illustrative diagram for explaining the operation of the tool attachment/detachment robot in the embodiment.

As illustrated in FIGS. 3 and 4, the tool holding device 20 is arranged within an operating area of the tool attachment/detachment robot 30 so as to face the tool attachment/detachment robot 30. The tool holding device 20 has elongated plate-shaped tool holding members 21, 23 and a frame 25. The tool holding members 21, 23 are arranged parallel to each other with a predetermined space therebetween. The frame 25 is arranged on the moving platform 15 so as to support the tool holding members 21, 23 in a standing position (in an erected state).

As viewed from the tool attachment/detachment robot 30, the tool holding members 21, 23 respectively have a plurality of cutouts 22, 24 on the right side faces thereof. The cutouts 22, 24 are formed to be open outward and are arranged at predetermined pitches in a vertical direction such that the cutouts 22 respectively overlap the cutouts 24. Each pair of corresponding cutouts 22, 24 forms the holding portion to which a tool body TB is to be attached. Specifically, each cutout 22, 24 has two parallel inner surfaces 22*a*, 22*b*, 24*a*, 24*b* and an inner surface 22*c*, 24*c*. The inner surfaces 22*a*, 22*b*, 24*a*, 24*b* are located in the vertical direction so as to face each other. The inner surface 22*c*, 24*c* is located on the inner side with respect to the opening of the cutout 22, 24 and disposed along the vertical direction. A tool body TB is held in each pair of cutouts 22, 24 by the portion of the tool holder TH of the tool body TB where the engagement grooves $TH_5$, $TH_5$ are formed being inserted into the cutouts 22, 24 and the engagement grooves $TH_5$, $TH_5$ engaging with the parallel inner surfaces 22*a*, 22*b*, 24*a*, 24*b* of the cutouts 22, 24. A tool body TB held in a pair of cutouts 22, 24 is indicated by dashed and dotted lines in FIG. 8.

The tool holding member 23 has, on the surface (back surface) opposite to the tool attachment/detachment robot 30, a proximity sensor 26 in the vicinity of each cutout 24. When a tool body TB is attached to each pair of cutouts 22, 24, the tool body TB is detected by the corresponding proximity sensor 26 and a detection signal for the detection is transmitted to the controller 50.

Figure 7:
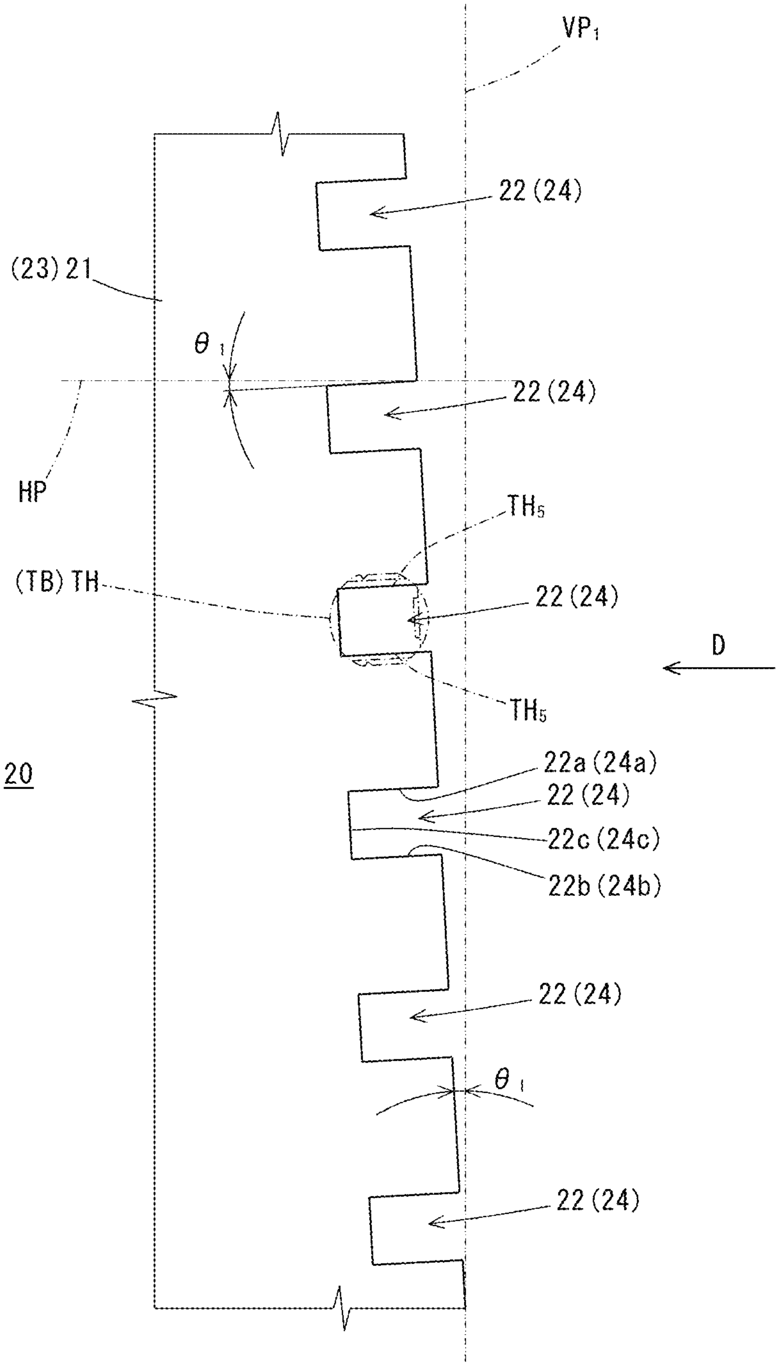
FIG. 7 is a partial front view of a tool holding member in the embodiment.
Figure 8:
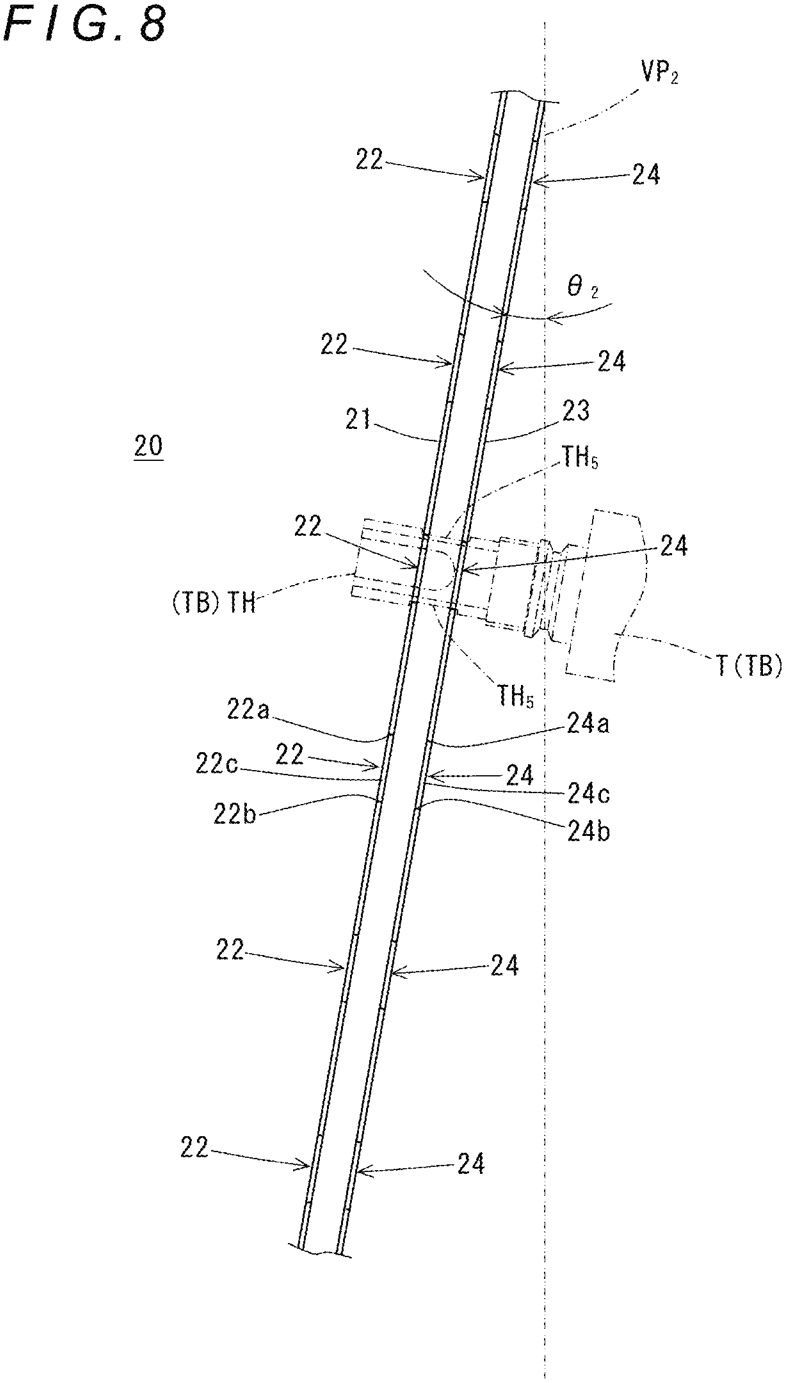
FIG. 8 is a partial side view of the tool holding member in the embodiment as viewed in the direction of arrow D in FIG. 7.

The tool holding members 21, 23 are supported by the frame 25 with the tool holding members 21, 23 inclined backward in a direction away from the tool attachment/detachment robot 30 as shown in FIGS. 3, 4, and 8 and with the upper end side of the tool holding members 21, 23 inclined at an angle $\theta_1$ in a direction away from a vertical plane $VP_1$ as shown in FIG. 7. Consequently, as shown in FIG. 7, the two inner surfaces 22*a*, 22*b*, 24*a*, 24*b* forming each cutout 22, 24 are inclined at the angle $\theta_1$ with respect to a horizontal plane HP with the opening of the cutout 22, 24 facing upward in a plane parallel to the arranged direction of the two inner surfaces 22*a*, 22*b*, 24*a*, 24*b* and orthogonal to the two inner surfaces 22*a*, 22*b*, 24*a*, 24*b*. Further, as shown in FIG. 8, each cutout 22, 24 is provided such that the plane parallel to the arranged direction of the two inner surfaces 22*a*, 22*b*, 24*a*, 24*b* and orthogonal to the two inner surfaces 22*a*, 22*b*, 24*a*, 24*b* is inclined at an angle $\theta_2$ with respect to a vertical plane $VP_2$.

Thus, the tool holding device 20 in this embodiment has the cutouts 22, 24 as a plurality of holding portions arranged at predetermined intervals in the vertical direction; therefore, the tool holding device 20 is able to hold a plurality of tool bodies TB in a manner such that the tool bodies TB are stacked on top of another.

Therefore, the planar space for installation of the tool holding members 21, 23 on the moving platform 15 is smaller than conventionally needed. Further, the narrowed installation space allows other devices needed for preferred configurations, such as the air blow device 40 for cleaning the tool T, to be installed on the moving platform 15, which enables multi-functionalization of the tool transport device 10.

Figure 5:
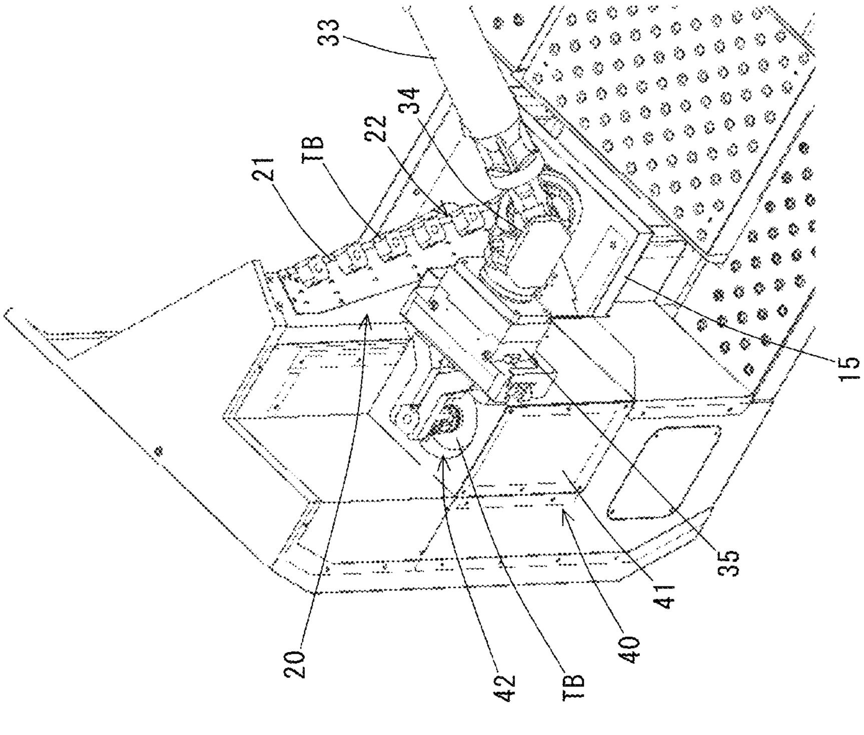
FIG. 5 is an illustrative diagram for explaining the operation of the tool attachment/detachment robot in the embodiment.

As illustrated in FIGS. 1 and 5, the air blow device 40 is located on the left of the tool holding device 20 as viewed from the tool attachment/detachment robot 30 within the operating area of the tool attachment/detachment robot 30. The air blow device 40 has a casing-like air blow box 41, a plurality of nozzles (not illustrated), a pressurized air supply source (not illustrated), and a control valve. The air blow box 41 has an opening 42 in a top surface thereof. The nozzles (not illustrated) are arranged in the air blow box 41 to eject pressurized air. The pressurized air supply source (not illustrated) supplies pressurized air to the nozzles (not illustrated) through an appropriate pipe (not illustrated). The control valve is arranged in the middle of the pipe (not illustrated).

The controller 50 is composed of a computer including a CPU, a RAM, and a ROM and controls operations of the moving device 11, tool attachment/detachment robot 30, air blow device 40, and other elements as described above. The controller 50 operates the tool transport device 10 in accordance with a predetermined operation program to extract a commanded tool body TB from a commanded tool magazine TM and then transport the extracted tool body TB to store it into a commanded tool storage rack 6. Conversely, the controller 50 extracts a commanded tool body TB from a commanded tool storage rack 6 and then transports the extracted tool body TB to store it into a commanded tool magazine TM.

In particular, specific operations for causing the tool transport device 10 to extract a specified tool body TB from a specified tool magazine TM and store the tool body TB into a specified tool storage rack 6 under control by the controller 50 are described here. It is assumed that information on the target tool magazine TM, the target tool storage rack 6, and the target storage position in the tool storage rack 6 as well as the operation commands (extraction command and storage command) are transmitted from a host management device (not illustrated) to the controller 50. Further, information on the tool body TB to be extracted and the extraction command are transmitted from the host management device (not illustrated) to the numerical controller (not illustrated) of the machine tool M including the target tool magazine TM. Upon receiving these command and information, the numerical controller (not illustrated) moves the commanded tool body TB from the tool magazine TM to a set entry/exit position TMa and then transmits an extraction preparation completion signal to the controller 50.

Upon receiving the information on the target tool magazine TM, the target tool storage rack 6, and the target storage position in the tool storage rack 6 as well as the operation commands (extraction command and storage command) from the management device (not illustrated) as described above, the controller 50 first drives the drive device 13 of the moving device 11 to move the moving platform 15 to the working position for the commanded tool magazine TM (moving operation). In this example, the moving platform 15 is moved to the working position for the tool magazine TM shown in FIG. 1. Note that this position of the moving platform 15 corresponds to the home position thereof. On the other hand, the numerical controller (not illustrated) of the machine tool M including the target tool magazine TM receives the information on the tool body TB to be extracted and the extraction command from the host management device (not illustrated). Thereafter, the numerical controller (not illustrated) drives the tool magazine TM to move the commanded tool body TB to the entry/exit position TMa shown in FIG. 1 and then transmits the extraction preparation completion signal to the controller 50.

Subsequently, upon completing the moving operation and receiving the extraction preparation completion signal from the target numerical controller (not illustrated), the controller 50 drives the tool attachment/detachment robot 30 to grip the tool body TB moved to the entry/exit position TMa in the tool magazine TM, namely, the outer surface of the end of the tool holder TH of the tool body TB where the width across flats $TH_2$, $TH_2$ are formed, with the hand 35 and extract the tool body TB from the tool magazine TM (extracting operation). Thereafter, the controller 50 transmits an extraction completion signal to the numerical controller (not illustrated). Where there are two or more tool bodies TB to be extracted that are commanded by the host management device (not illustrated), the numerical controller (not illustrated) repeatedly executes the process of moving the tool body TB to be extracted next to the entry/exit position TMa and transmitting the extraction preparation completion signal to the controller 50 after receiving the extraction completion signal from the controller 50.

Subsequently, as shown in FIG. 5, the controller 50 drives the tool attachment/detachment robot 30 to load the tool body TB gripped with the hand 35 into the air blow box 41 through the top opening 42 of the air blow box 41 (loading operation) and opens the control valve (not illustrated) for a predetermined time to eject pressurized air from the nozzles (not illustrated) (ejecting operation). Thereby, chips and coolant adhering to the tool T of the tool body TB are blown off by the ejected flow of air so that the tool T is cleaned.

After pressurized air is ejected from the nozzles (not illustrated) for a predetermined time as described above, the controller 50 drives the tool attachment/detachment robot 30 to unload the tool body TB from the air blow box 41 (unloading operation). Thereafter, as shown in FIGS. 3 and 4, the controller 50 inserts the unloaded tool body TB, namely, the portion of the tool holder TH of the tool body TB where the engagement grooves (engagement surfaces) $TH_5$, $TH_5$ are formed, into an empty pair of cutouts 22, 24 of the tool holding device 20 and engages the engagement grooves $TH_5$, $TH_5$ with the parallel inner surfaces 22*a*, 22*b*, 24*a*, 24*b* of the cutouts 22, 24 so that the tool body TB is held by the tool holding device 20 (temporarily placing operation), and closes the control valve (not illustrated) to stop the ejection of pressurized air from the nozzles (not illustrated) (stopping operation).

Where there are two or more tool bodies TB to be extracted that are commanded by the host management device (not illustrated), the controller 50 executes for each of the tool bodies TB to be extracted the extracting operation, the loading operation, the ejecting operation, the unloading operation, the temporarily placing operation, and the stopping operation after receiving the extraction preparation completion signal from the numerical controller (not illustrated).

If the tool holding members 21, 23 are disposed vertically, a pair of cutouts 22, 24 located at a higher position requires a larger tilt of the first arm 32 of the tool attachment/detachment robot 30 away from the tool holding members 21, 23, i.e., in a direction away from the tool holding members 21, 23 (the direction of arrow C in FIGS. 3 and 4) when the tool attachment/detachment robot 30 attaches a tool body TB to the pair of cutouts 22, 24. This results in the tool attachment/detachment robot 30 operating in a constrained manner, and, in some cases, the tool attachment/detachment robot 30 becoming inoperable due to its singularities.

The tool holding members 21, 23 in this embodiment are inclined backward at the angle $\theta_2$ with respect to the vertical plane $VP_2$ in the direction away from the tool attachment/detachment robot 30. Therefore, the first arm 32 of the tool attachment/detachment robot 30 does not need to be extremely tilted away from the tool holding members 21, 23 (in a direction away from the tool holding members 21, 23 (the direction of arrow C in FIGS. 3 and 4)) when the tool attachment/detachment robot 30 attaches a tool body TB to a pair of cutouts 22, 24 located at a high position, which allows the tool attachment/detachment robot 30 to operate smoothly.

After completion of the extraction of the commanded tool body TB from the tool magazine TM, the controller 50 drives the drive device 13 of the moving device 11 to move the moving platform 15 to the working position for the commanded tool storage rack 6 (transporting operation).

In this operation, the tool body TB is stably held by the tool holding device 20 even if vertical vibration generated by the movement of the moving platform 15 propagates to the tool holding device 20. Specifically, as described above, the tool body TB is held in a pair of cutouts 22, 24 by the engagement grooves $TH_5$, $TH_5$ of the tool holder TH of the tool body TB engaging with the two parallel inner surfaces 22*a*, 22*b*, 24*a*, 24*b* of the cutouts 22, 24. The cutouts 22, 24 are provided such that the plane parallel to the arranged direction of the two inner surfaces 22*a*, 22*b*, 24*a*, 24*b* and orthogonal to the two inner surfaces 22*a*, 22*b*, 24*a*, 24*b* is inclined backward at the angle $\theta_2$ with respect to the vertical plane $VP_2$ in the direction away from the tool attachment/detachment robot 30. Thus, the tool body TB is held in a downwardly inclined state in the cutouts 22, 24 with the distal end thereof directed downward. Therefore, not only the own weight of the tool body TB but also a moment corresponding to the weight of the tool body TB act on the engagement between the tool body TB and the cutouts 22, 24.

Consequently, even if vertical vibration generated by the movement of the moving platform 15 propagates to the cutouts 22, 24, the tool body TB held in the cutouts 22, 24 hardly vibrates vertically in synchronization with the propagating vertical vibration. Therefore, even if the tool body TB vibrates, the restraining force caused by friction between the tool body TB and the cutouts 22, 24 is maintained, whereby the tool body TB is maintained in the state of being held in the cutouts 22, 24.

Further, the cutouts 22, 24 are provided such that the two inner surfaces 22*a*, 22*b*, 24*a*, 24*b* are inclined at the angle $\theta_1$ with respect to the horizontal plane HP with the opening facing upward in the plane parallel to the arranged direction of the two inner surfaces 22*a*, 22*b*, 24*a*, 24*b* and orthogonal to the two inner surfaces 22*a*, 22*b*, 24*a*, 24*b*. Therefore, when the tool body TB is held in the cutouts 22, 24 by insertion through the opening of the cutouts 22, 24 such that the engagement grooves (engagement surfaces) $TH_5$, $TH_5$ of the tool holder TH engage with the two parallel inner surfaces of the cutouts 22, 24, the tool body TB receives a biasing force toward the side opposite to the opening of the cutouts 22, 24 (i.e., toward the inner surfaces 22*c*, 24*c* side) due to its own weight. Thereby, the tool body is more effectively prevented from falling from the holding portion due to propagation of vertical vibration generated by the movement of the moving platform 15.

Thus, the tool transport device 10 enables a tool body TB to be transported in the state of being stably held in the cutouts 22, 24 of the tool holding members 21, 23 even if vertical vibration propagates to the cutouts 22, 24 in the transport. Therefore, it is not necessary to take a special measure, such as providing the cutouts 22, 24 with means for tool clamping, in order to prevent the tool body TB from falling from the cutouts 22, 24, which enables the tool holding members 21, 23 to be manufactured at low cost.

Note that the preferable ranges of the angles $\theta_1$ and $\theta_2$ can be set on the basis of empirical knowledge, such as stable transport of the tool body TB and preferable operating conditions of the tool attachment/detachment robot 30. For example, it is preferable that the ranges of the angles $\theta_1$ and $\theta_2$ are set to the following ranges:

$$10° \leq \theta_1 \leq 45°;$$

$$\text{and } 5° \leq \theta_2 \leq 45°.$$

After completion of the transporting operation, the controller 50 drives the tool attachment/detachment robot 30 to store the tool body TB held by the tool holding device 20 into the commanded storage position in the commanded tool storage rack 6 (storing operation). Where there are two or more tool bodies TB to be stored, this storing operation is executed for each of the tool bodies TB.

Thus, the controller 50 extracts the commanded tool body TB from the commanded tool magazine TM and then stores the tool body TB into the commanded tool storage rack 6. Further, the controller 50 is able to do the reverse in order to extract a commanded tool body TB from a commanded tool storage rack 6 and store the tool body TB into a commanded tool magazine TM. In this process, since the tool body TB in the tool storage rack 6 is supposed to be kept clean, the loading operation, the ejecting operation, the unloading operation, and the stopping operation that are to be executed in order to clean the tool body TB can be omitted.

As described above, the tool transport device 10 in this embodiment enables the tool body TB to be transported in the state of being stably held in the cutouts 22, 24 of the tool holding members 21, 23 even if vertical vibration propagates to the cutouts 22, 24 in the transport. Therefore, it is not necessary to take a special measure, such as providing the cutouts 22, 24 with means for tool clamping, in order to prevent the tool body TB from falling from the cutouts 22, 24, which enables the tool holding device 20 to be manufactured at low cost.

Further, since the tool holding members 21, 23 in this embodiment are inclined backward in the direction away from the tool attachment/detachment robot 30, the first arm 32 of the tool attachment/detachment robot 30 does not need to be extremely tilted away from the tool holding members 21, 23 (i.e., in a direction away from the tool holding members 21, 23) when the tool attachment/detachment robot 30 attaches a tool body TB to the cutouts 22, 24 located at a high position, which allows the tool attachment/detachment robot 30 to operate smoothly.

Above has been described an embodiment of the present invention. However, it should be noted that the present invention is not limited to the above-described embodiment and can be implemented in other manners.

For example, in the above-described embodiment, the tool holding members 21, 23 are individually composed of a plate-shaped member for the purpose of weight reduction. However, the tool holding members 21, 23 are not limited thereto and, for example, may be composed of a single block-shaped member like one formed by integrating the tool holding members 21, 23.

Further, in the above-described embodiment, a plurality of pairs of cutouts 22, 24 are provided. However, the present invention is not limited to such a configuration and a configuration is possible in which a single pair of cutouts 22, 24 is provided. Also in this configuration, it is preferred that the tool holding members 21, 23 are inclined backward at the angle $\theta_2$ with respect to the vertical plane $VP_2$ in a direction away from the tool attachment/detachment robot 30 and the cutouts 22, 24 are provided such that the two inner surfaces 22*a*, 22*b*, 24*a*, 24*b* are inclined at the angle $\theta_1$ with respect to the horizontal plane HP with the opening facing upward in the plane parallel to the arranged direction of the two inner surfaces 22*a*, 22*b*, 24*a*, 24*b* and orthogonal to the two inner surfaces 22*a*, 22*b*, 24*a*, 24*b*.

Further, in the above-described embodiment, the controller 50 is configured to sequentially execute the loading operation, the ejecting operation, the unloading operation, the temporarily placing operation, and the stopping operation as operations for cleaning the tool body TB. However, the present invention is not limited to this configuration. The controller may be configured to execute the loading operation and the ejecting operation simultaneously or such that one of the loading operation and ejecting operation precedes the other one of the loading operation and ejecting operation but these operations overlap each other for a predetermined time and then execute the unloading operation and the stopping operation simultaneously or such that one of the unloading operation and stopping operation precedes the other one of the unloading operation and stopping operation. With this configuration, the execution of the loading operation and the execution of the ejecting operation overlap each other and the execution of the unloading operation and the execution of the stopping operation overlap each other, which enables the entire tool body TB to be cleaned more effectively and reduces the processing time for cleaning the tool body TB.

Further, the controller 50 may be configured to, in the loading operation, cause the tool attachment/detachment robot 30 to rotate the tool body TB about an axis of the tool body TB for a predetermined time after loading the tool body TB into the air blow box 41. Alternatively, the controller 50 may be configured to cause the tool attachment/ detachment robot 30 to reciprocate the tool body TB in an axial direction of the tool body TB for a predetermined time after loading the tool body TB into the air blow box 41. Alternatively, the controller 50 may be configured to execute the rotating operation and the reciprocating operation sequentially in any order or simultaneously. These configurations enable chips and coolant adhering to the tool body TB to be removed more effectively.

Further, in the above-described embodiment, one execution of the extraction, transport, and storage targets one tool magazine TM and one tool storage rack. However, the present invention is not limited to this configuration. One execution of the extraction, transport, and storage may target two or more tool magazines TM and two or more tool storage racks 6. In such a case, commanded tool bodies TB are extracted through sequential movement to the commanded tool magazines TM and then the extracted commanded tool bodies TB are stored through sequential movement to the commanded tool storage racks 6.

The moving platform 15 in the above-described embodiment is moved on the path formed by the guide rails 14. However, the present invention is not limited to this configuration. For example, the moving platform 15 may be mounted on an automated guided vehicle and moved tracklessly by the automated guided vehicle.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

- 1 Machining system
- 5 Tool storage device
- 6 Tool storage rack
- 7 Support frame
- 8 Holding frame
- 10 Tool transport device
- 11 Moving device
- 12 Support base
- 13 Drive device
- 14 Guide rail
- 15 Moving platform
- 20 Tool holding device
- 21, 23 Tool holding member
- 22, 24 Cutout
- 23 Frame
- 30 Tool attachment/detachment robot
- 35 Hand
- 40 Air blow device
- 41 Air blow box
- 42 Opening
- 50 Controller
- M Machine tool
- TM Tool magazine
- T Tool
- TH Tool holder
- TB Tool body

The invention claimed is:

1. A tool transport device transporting a tool body between a machine tool including a tool magazine holding a plurality of tool bodies and a tool storage device storing a plurality of tool bodies, the tool body comprising a tool and a tubular member having the tool inserted therein, wherein the tool transport device comprises:

a moving device having a moving platform and configured to move the moving platform to a working position set for the tool magazine and to a working position set for the tool storage device;

a tool attachment/detachment robot and a tool holding member arranged on the moving platform; and a controller configured to control operations of the moving device and tool attachment/detachment robot; and the tool attachment/detachment robot is configured to transport the tool body by gripping an outer peripheral portion of the tubular member;

the tool holding member is disposed within an operating area of the tool attachment/detachment robot and has a cutout-shaped holding portion formed on a side face thereof, the holding portion having:

an opening, at least two parallel inner surfaces spaced apart in a vertical direction and facing each other, and a far side inner surface located on a far side of the opening and connecting the two parallel inner surfaces in the vertical direction;

the holding portion is configured such that the two inner surfaces thereof are able to engage with two parallel engagement surfaces formed in a direction perpendicular to an axis of the tubular member on an outer peripheral portion of the tubular member; and the holding portion is formed on the tool holding member such that a plane parallel to an arranged direction of the two inner surfaces and orthogonal to both the two inner surfaces and the far side inner surface is inclined backward in a direction away from the tool attachment/detachment robot; and the holding portion is provided such that the two inner surfaces are inclined with the opening facing upward with respect to a horizontal line in the plane parallel to the arranged direction of the two inner surfaces and orthogonal to both the two inner surfaces and the far side inner surface.

2. The tool transport device according to claim 1, wherein a plurality of holding portions are provided at predetermined intervals in the vertical direction.

3. The tool transport device according to claim 2, wherein the tool holding member is erected on the moving platform with the tool holding member inclined backward in a direction away from the tool attachment/detachment robot.

4. The tool transport device according to claim 1, characterized in that wherein the tool holding member is erected on the moving platform with the tool holding member inclined backward in a direction away from the tool attachment/detachment robot.

5. The tool transport device according to claim 1, wherein a plurality of holding portions are provided at predetermined intervals in the vertical direction.

6. The tool transport device according to claim 5, wherein the tool holding member is erected on the moving platform with the tool holding member inclined backward in a direction away from the tool attachment/detachment robot.

7. The tool transport device according to claim 1, wherein the tool holding member is erected on the moving platform with the tool holding member inclined backward in a direction away from the tool attachment/detachment robot.

* * * * *